Oct. 23, 1923.  1,471,554
D. GACOPETTA
COMBINED TAIL LIGHT AND LICENSE MARKER ILLUMINATOR
Filed Dec. 8, 1922
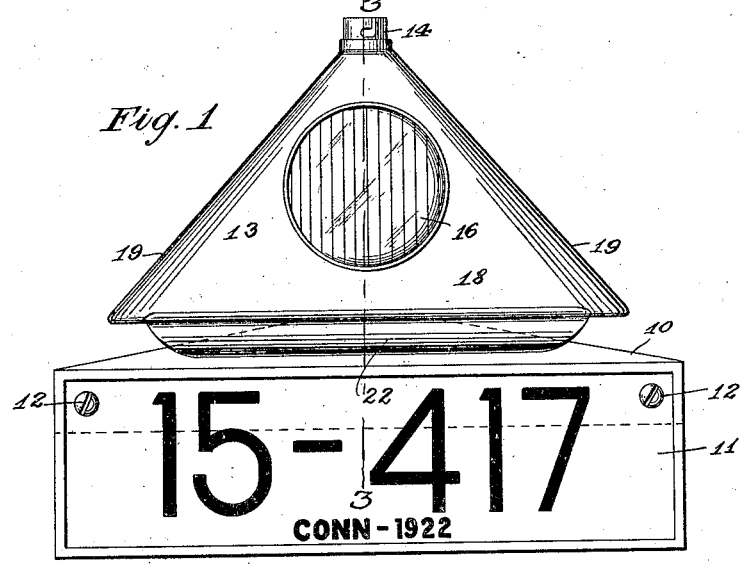
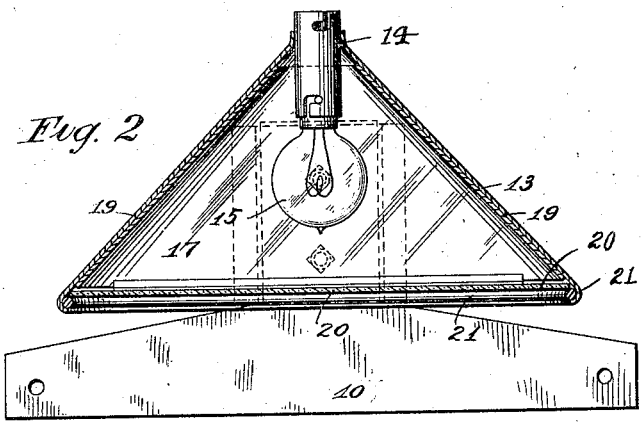
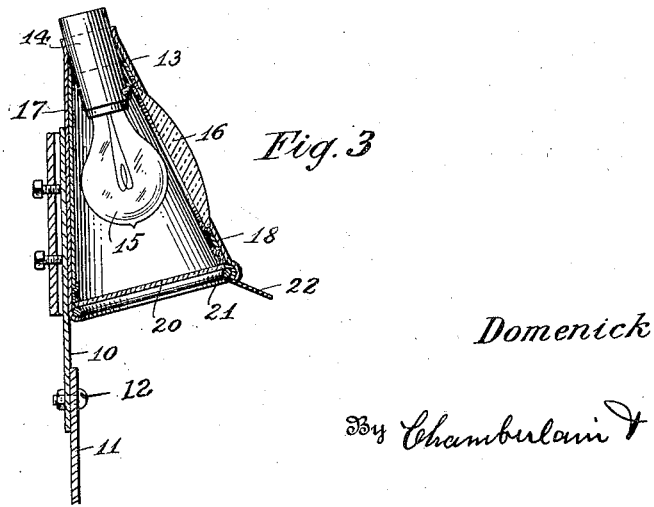
Inventor
Domenick Gacopetta
By Chamberlain & Newman
Attorneys Patented Oct. 23, 1923.

1,471,554

UNITED STATES PATENT OFFICE.

DOMENICK GACOPETTA, OF NORWALK, CONNECTICUT.

COMBINED TAIL LIGHT AND LICENSE-MARKER ILLUMINATOR.

Application filed December 8, 1922. Serial No. 605,720.

*To all whom it may concern:*

Be it known that I, DOMENICK GACOPETTA, a subject of the King of Italy, and resident of Norwalk, in the county of Fairfield and State of Connecticut, have invented certain new and useful Improvements in Combined Tail Light and License-Marker Illuminators, of which the following is a specification.

This invention relates to a combined tail light and means for illuminating the rear end license plate on vehicles such as automobiles, wagons, carriages, etc., the device being so constructed and arranged that a single lamp may be employed for both purposes.

The object of the invention is to provide a special form of casing containing a lamp and to arrange the same above and with respect to the license plate so that the light from the lamp will be reflected upon the license plate with improved results, and further to so design and position the casing as to cover and protect the plate against snow and sleet, which under certain conditions would cover and obscure the numbers upon the plate, and further to also provide in the casing a tail light of the required standard.

With these and other objects in view the the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a rear elevation of my combined tail light and illuminating device showing a number plate supported beneath the same;

Fig. 2 shows a longitudinal section of the device, the number plate being omitted, and Fig. 3 shows a cross section through the center of the device, on line 3—3 of Fig. 1.

Referring in detail to the characters of reference marked upon the drawings, 10 represents a license plate bracket which may be secured to a vehicle in any desired or preferred manner, and 11 represents the license plate which is shown removably attached to the bracket by means of screws 12, and may be of any of the well known commercial forms of bracket and plate.

The illuminating device as shown, comprises a sheet metal casing 13, which is preferably of a general flat conical shape, having its apex central of and at the top of the casing, terminating in a socket 14 for the attachment of a standard electric plug, not shown. The lamp 15 is suspended inside and central of the casing directly behind the glass 16 forming the red tail light. The rear wall 17 of the casing is positioned vertically above and substantially in alignment with the license plate, whereas the front wall 18 in which the tail light glass 16 is located, is positioned at an acute angle with reference to the rear wall and plate, thereby forming by its inner surface an angularly positioned reflecting surface which reflects the rays from the lamp directly against the plate with greater efficiency than would be possible were the wall positioned otherwise. The angular position of the end walls 19 of the casing also serves to further deflect the rays of light from the lamp down against the number plate. The casing as a whole is sufficiently broad to cover the numbers on the plate so that the rays of light are fully and evenly distributed throughout the entire surface of the plate. The bottom side of the casing is enclosed by a glass 20 which is held in position by a wire loop 21 positioned in an internal groove formed in the lower edge portion of the casing, so as to protect the lamp inside of the casing, the inner walls of which are plated and highly polished.

22 represents a depending flange that projects downwardly and rearwardly from the lower edge of the rear wall 18 of the casing so as to form further reflecting means to extenuate the rays of the light and to further protect the face of the plate.

Having thus described my invention what I claim and desire to secure by Letters Patent is—

1. A combined tail light and illuminating device for license plates comprising a relatively flat shaped conical casing, having plane front and rear walls the apex of which is positioned uppermost, the rear wall of the casing being disposed at an acute angle with reference to the front vertical wall, a tail light glass positioned in said rear wall, a vertically disposed number plate positioned beneath the casing in substantially vertical alignment with the front vertical wall, a lamp positioned in the upper central portion of the casing, the rays of light from which are reflected by the outer angularly disposed wall of the casing against the face of the license plate.

2. A combined tail light and illuminating device for license plates comprising a relatively flat shaped conical casing, the apex of which is positioned uppermost, the rear wall of the casing being disposed at an acute angle with reference to the front vertical wall, a tail light glass positioned in said rear wall, a number plate positioned beneath the casing in substantially vertical alignment with the front vertical wall, a lamp positioned in the upper central portion of the casing, the rays of light from which are reflected by the outer angularly disposed wall of the casing against the face of the license plate, a flange extended downwardly and rearwardly from the outer edge portion of the casing, and a glass closing the bottom of the casing through which the rays of light are projected against the number plate.

Signed at Bridgeport, in the county of Fairfield and State of Connecticut, this 6th day of December A. D., 1922.

DOMENICK GACOPETTA.

Witnesses:
C. M. NEWMAN,
ELBERT O. HULL.